April 8, 1969 P. FEJES 3,437,207
MEANS FOR PURIFYING WATER
Filed Oct. 5, 1964
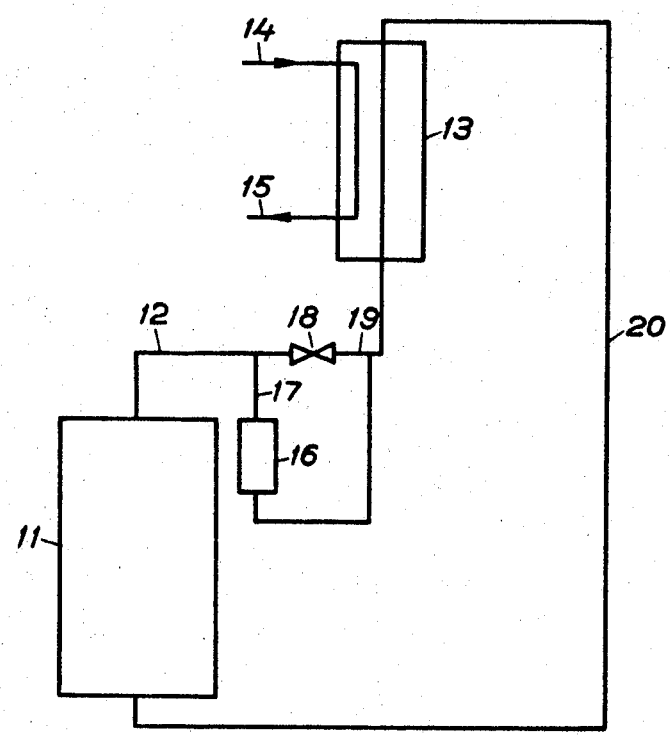
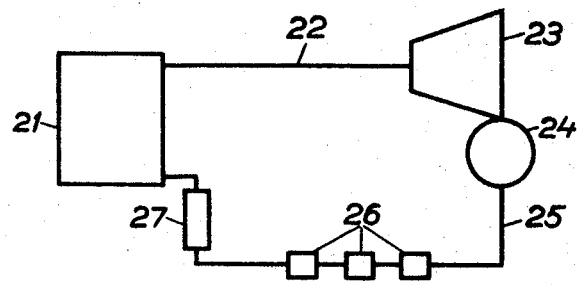
INVENTOR.
PETER FEJES
BY
Bailey, Stephens & Huettig
ATTORNEYS

# United States Patent Office 3,437,207
Patented Apr. 8, 1969

3,437,207
MEANS FOR PURIFYING WATER
Peter Fejes, Vasteras, Sweden, assignor to Allmanna Svenska Elektriska Aktiebolaget, Vasteras, Sweden, a corporation of Sweden
Filed Oct. 5, 1964, Ser. No. 401,491
Claims priority, application Sweden, Oct. 10, 1963, 11,084/63
Int. Cl. B01d 35/02, 29/08
U.S. Cl. 210—287                    3 Claims

ABSTRACT OF THE DISCLOSURE

Water in the primary circuit of a nuclear reactor or feed water for a steam power plant is purified by passing it through a bed of pellets of iron or steel having a thin surface layer of an oxide with spinel structure.

---

In the operation of nuclear reactors corrosion products are formed in the water in the primary circuit. The corrosion products spread themselves out in the primary circuit and precipitate in the whole of that circuit. In the passage of the corrosion products through the reactor core, they become radio active, which results in the whole primary system becoming contaminated by radio active substances. This is very inconvenient, amongst other things because it entails large problems in changing or repairing of parts and devices in the primary circuit, for example heat exchangers. It has therefore only been possible to allow a certain maximum degree of contamination in the system. In order to keep the degree of contamination down it has up to now been usual to carry out the purifying of the primary water with ion exchange beds. Practical ion exchange beds can however not be used at the temperature which the primary water has, so it has been necessary to cool the water before purifying. If all the primary water were passed through ion exchange beds before it is brought back to the primary circuit, it would entail a very great power loss and therefore it has been necessary to conduct only a small part of the primary water through the ion exchange bed which is for that purpose arranged in a branch conduit together with the necessary heat exchanger for the cooling of the water. Because it has been possible to conduct only a part of the primary water through the ion exchange bed the main part of the corrosion products remains in the primary circuit, with the result that difficulties in keeping the degree of contamination to an allowed level arise.

In order to bring about a complete purification of the primary water, a filter consisting of beds of magnetite grains has been tried. Thanks to the fact that magnetite withstands high temperatures, it should be possible to allow all of the water of the primary circuit to pass such filters without cooling the water simultaneously and without the loss of power caused by the cooling. It has however not been possible to produce magnetite filters which retain constant properties during use. Amongst other things this is dependent on the fact that the mechanical properties of the magnetite are unsatisfactory so that the filters easily fall to pieces.

The problem with purifying water also occurs in steam power plants. The feed water in such plants is purified usually with cardboard filters or precoat filters which must be placed in front of the preheaters so that they are not destroyed, as they do not withstand high temperatures. This brings about the disadvantage that corrosion products formed in the preheater go into the steam generator or corresponding part where the steam is generated.

Filters consisting of beds of metal grains sintered together, for example balls of brass, are known, but these have the disadvantage that for several purposes they do not have sufficient resistance against hot water, so that the filters themselves give rise to harmful corrosion products.

According to the present invention the above mentioned disadvantages with previously known purifying means are avoided. A purifying means according to the invention has an extraordinary resistance against hot water, so that the water to be purified in it does not need to be cooled beforehand. Besides, it has very good mechanical properties and an excellently defined fall of pressure.

The invention refers to a means for purifying water, especially for purifying water in the primary circuit of a nuclear reactor or for purifying feed water in a steam power plant, comprising an oxide containing iron in the form of magnetite or in the form of another oxide with spinel structure containing also other metals occurring in steel. It is characterised in that it comprises a bed of iron or steel pellets which are provided with a thin surface layer of the oxide formed on the pellets.

The bed of the pellets functions mainly as a mechanical filter when used for purifying water which does not contain radio-active substances. When used for purifying water contaminated by radio-active substances such as water in the primary circuit of nuclear reactors, the filter bed has a mechanical filter effect.

Iron and steel pellets are intended to mean pellets of different types of iron, amongst others cast iron and pig iron, of different types of steel such as ordinary unalloyed types of steel and different types of alloyed steel such as among others stainless steel and chromium steel.

As is clear from what has been said, the oxide surface layer may besides magnetite, $Fe_3O_4$ consist of another oxide with spinel structure, for example an oxide containing two or several of the metal constituents of the steel, such as for example iron, nickel and chromium.

If the pellets are arranged loosely in relation to each other so that they are movable mutually, the special advantage is attained that the filter bed gets very good reverse rinsing properties. During reverse rinsing the pellets knock against each other so that sludge and other loose deposits come loose and can easily be washed away.

Iron or steel pellets have suitably an average particle size of $40-1400\mu$ and preferably an average particle size of $400-900\mu$.

The thickness of the thin oxide layer is suitably between $0.05\mu$ and $20\mu$, preferably $0.1\mu$ to $10\mu$.

The oxide surface on the iron or steel pellets may with advantage be effected by the pellets being heated in the presence of liquid water or steam for a time which depends on the temperature used, for example at 150° C. or above for one or a couple of days. The composition of the oxide layer therefore becomes dependent on the composition of the iron or steel which is used in the pellets. It is common property for all oxide layers obtained that they consist of oxides which contain iron.

In the manufacture of filter beds with pellets sintered together the above mentioned treatment for producing the oxide layer is suitably performed after the pellets have been sintered together. The dimensions of the filter bed depends on its use.

Regeneration of the filter can be made very simply by removing the oxide layer with the material taken up by it, by dissolving the oxide layer in a chemical way, e.g. with citric acid or ammonium citrate, after which the pellets are provided with a new oxide layer, for example in the way described above.

Below two embodiments of the purifying means according to the invention are described with reference to the figures on the attached drawing, where FIG. 1 shows schematically a nuclear reactor plant and FIG. 2 schematically a steam power plant.

According to FIG. 1 the cooling medium of the nuclear reactor 11 in the form of light or heavy oxygen-free water goes through the conduit 12 in the primary circuit of the reactor to the heat exchanger 13, where the heat content of the water is taken care of in the secondary circuit with inlet for the used medium at 14 and outlet at 15. Before the cooling medium goes into the heat exchanger 13, it passes through the purifying means 16 according to the invention in the conduit 17, where the radio-active corrosion products are adsorbed and undergo exchange reactions with the oxide on the pellets. The cooling medium can in its entirety be conducted through the conduit 17 by keeping the valve 18 closed. It is also possible if desired to conduct a part of the cooling medium through the conduit 17 and a part through the conduit 19, before it is conducted further to the heat exchanger 13. After the passage through the heat exchanger, the cooling medium is returned to the reactor through the conductor 20.

According to FIG. 2 steam generated in the steam boiler 21 goes to the turbine 23 through the conduit 22 with the condenser 24. After the passage through the preheaters 26 in the conduit 25 the oxygen-free feed water goes to the purifying means 27 according to the invention.

The purifying means 16 and 27 can for example consist of beds of cylindrical form of the steel pellets of unalloyed steel of previously mentioned type, which are provided in the manner described with oxide surface layers.

Even if the use of the purifying means according to the invention is exemplified especially for purifying cooling water in the primary circuit in an atomic power plant or for purifying feed water in a steam power plant, it is obvious that the purification of water can be used in other cases, especially when there is a great need of low degree of contamination, when there is a need of a defined fall of pressure at the purifying means and when the cooling of the water in connection with the purifying should be avoided.

I claim:

1. Means for purifying water comprising a container having an outlet and an inlet for the water to be purified, a bed of pellets within the container intermediate said inlet and said outlet consisting essentially of a metal selected from the group consisting of iron and steel, said pellets being provided with a thin surface layer of an oxide formed on the pellet and comprising an oxide with spinel structure, said oxide surface layer having a thickness of about $0.05\mu$ to $20\mu$.

2. Means as claimed in claim 1, in which said pellets have a size corresponding to an average particle size of 40–1400.

3. Means as claimed in claim 1, in which said pellets are arranged loosely in relation to each other.

References Cited

UNITED STATES PATENTS

| | | | |
|---|---|---|---|
| 2,302,450 | 11/1942 | Laughlin | 210—290 X |
| 2,943,739 | 7/1960 | Maynard | 210—223 |
| 2,951,586 | 9/1960 | Moriya | 210—223 |
| 3,182,803 | 5/1956 | Chisholm | 210—266 |

SAMIH N. ZAHARNA, *Primary Examiner.*